Sept. 27, 1932.  J. H. ROBERTSON  1,879,508
VARIABLE FRICTION GEARING
Filed July 20, 1929    4 Sheets-Sheet 3
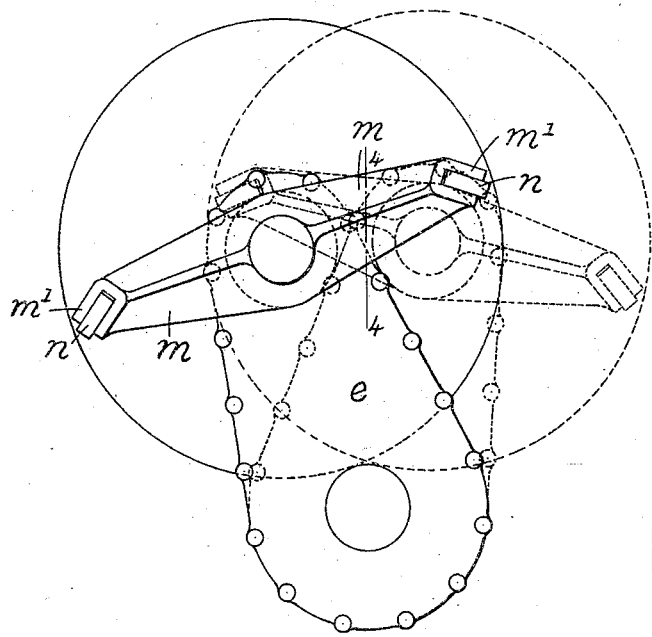
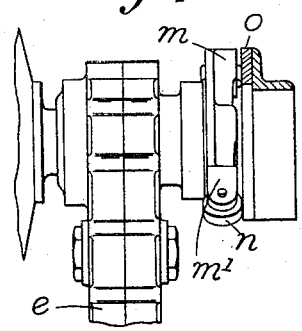
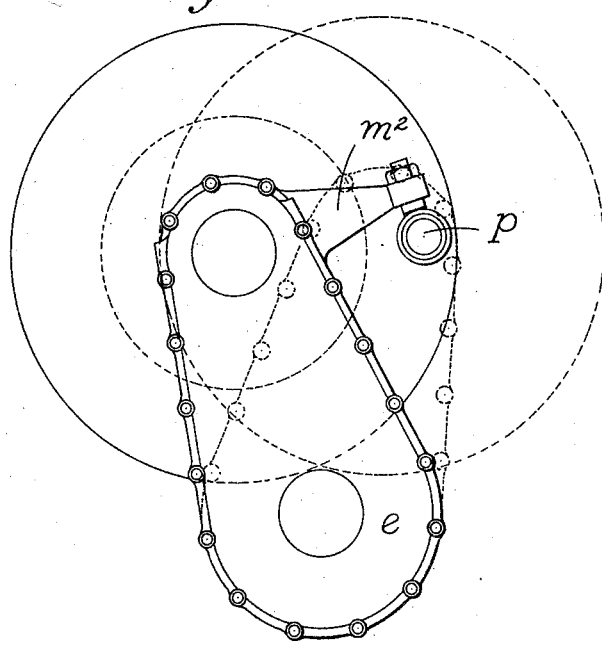
Inventor,
John Hogg Robertson
By Pennie Davis Marvin & Edmonds
Attorneys Sept. 27, 1932.  J. H. ROBERTSON  1,879,508
VARIABLE FRICTION GEARING
Filed July 20, 1929  4 Sheets-Sheet 4

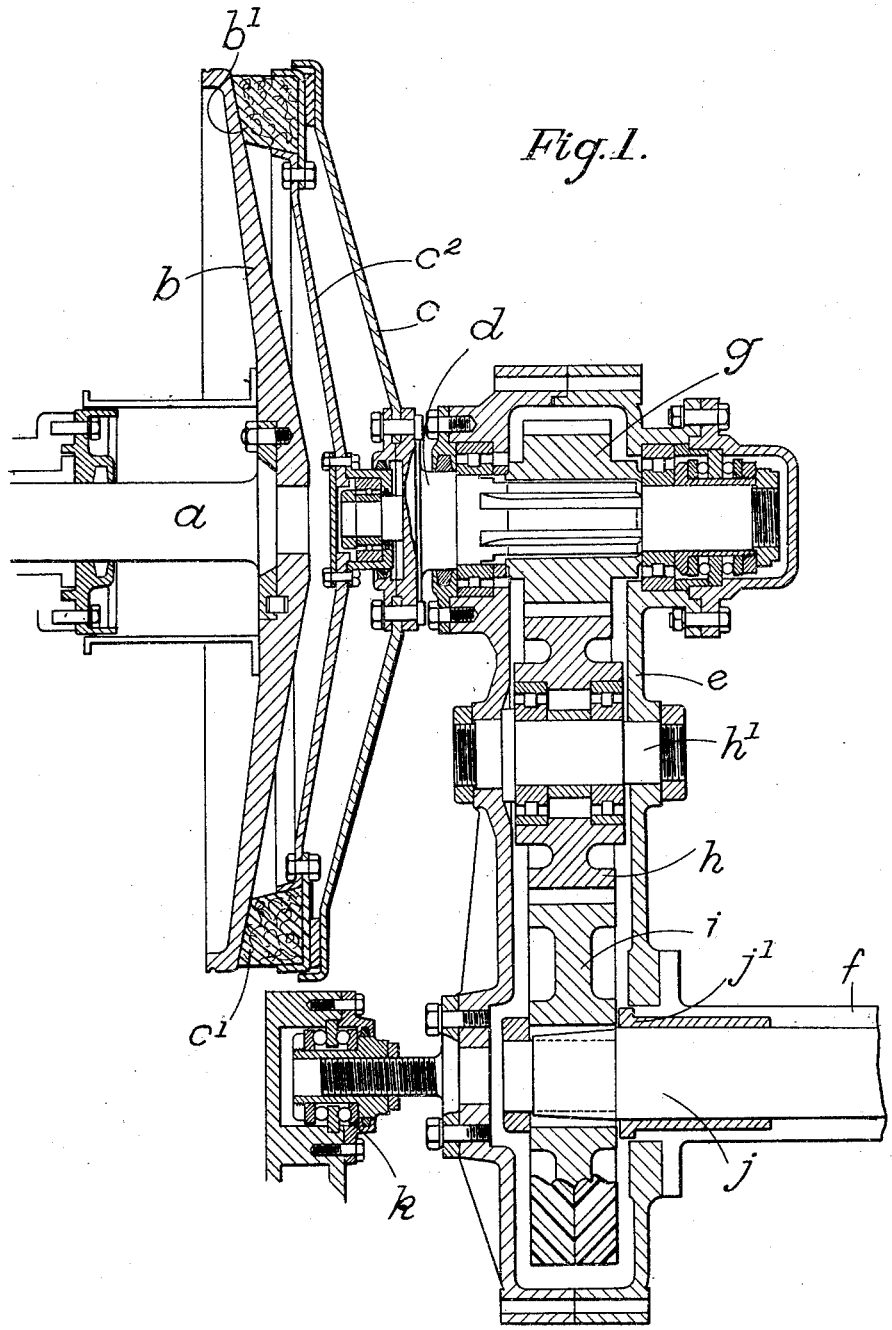

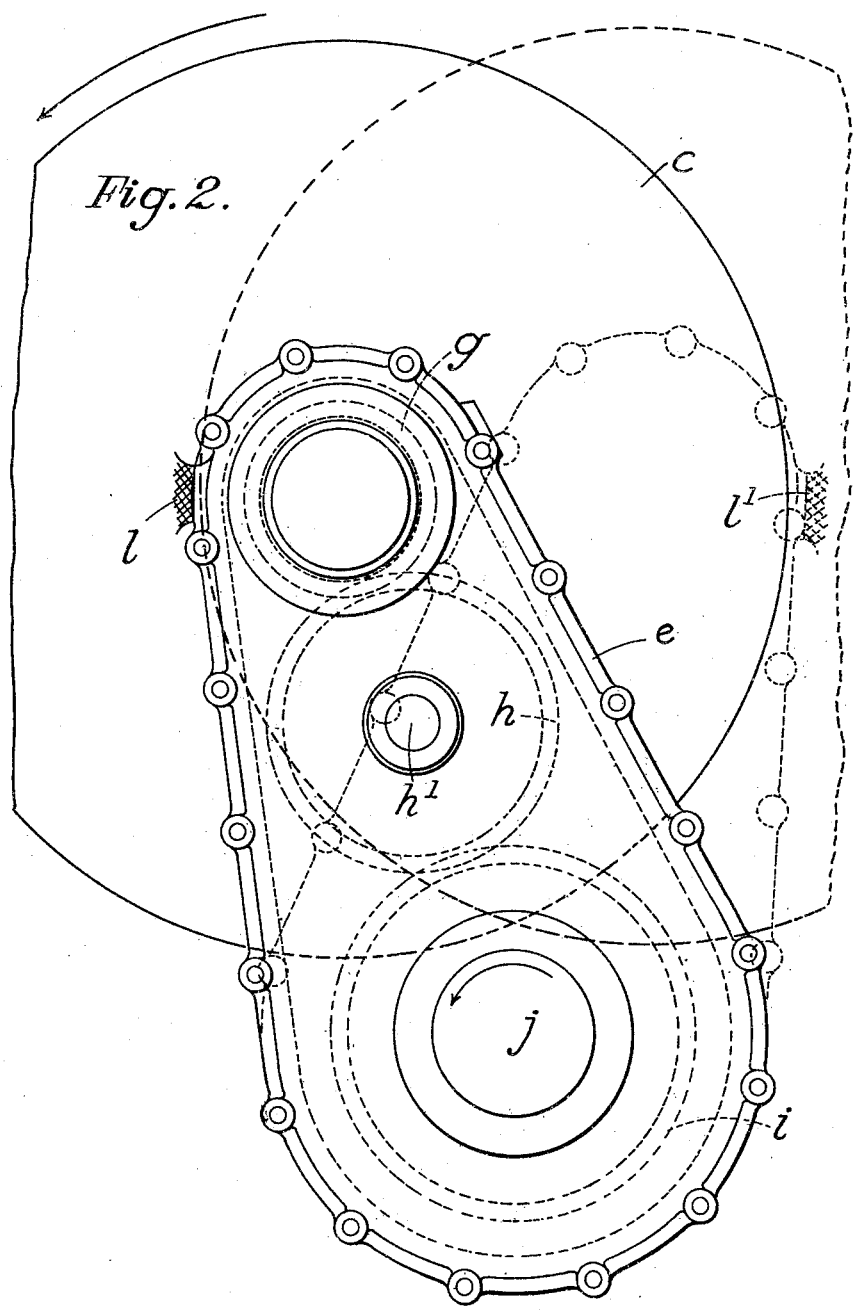

Inventor:
John Hogg Robertson
By Pennie Davis Marvin + Edmonds
attorneys

Patented Sept. 27, 1932

1,879,508

UNITED STATES PATENT OFFICE

JOHN HOGG ROBERTSON, OF LONDON, ENGLAND

VARIABLE FRICTION GEARING

Application filed July 20, 1929, Serial No. 379,752, and in Great Britain July 27, 1928.

My present invention relates to continuously variable friction gearing of the type in which a driven member is adapted to make face contact with a driving member, a direct drive position being provided in which the two members engage coaxially, in the manner of a disc or cone clutch, and a series of indirect drive positions being provided in which one member is displaced laterally to a variable extent so that contact takes place at points (or limited areas) of which the respective radial distances from the axes of the two members are unequal.

The present invention comprises an improved mechanism of the above type, in which the laterally displaceable member is supported by a radius arm adapted to swing around an axis to one side of and parallel to the axes of the two members, characterized by the fact that the said radius arm is combined with a demultiplication or other gearing which transmits power from the driven member of the friction gearing to a driven shaft. The latter is preferably arranged between the axis of the said driven member and the pivotal axis of the radius arm, or actually in line with said pivotal axis. The gearing combined with the radius arm may consist of a simple train of gears, a chain drive or the like, giving for example a reduction of speed.

The gearing combined with the radius arm may be so arranged that the reaction due to the torque transmitted tends to swing the radius arm about its pivotal axis so as automatically to bring the driven disc of the friction gearing towards its laterally displaced or low gear position, in accordance with the invention claimed in my pending patent application Serial No. 291,122, filed July 7th, 1928. This arrangement may be so designed that the position of the laterally displaced member is controlled automatically in accordance with the magnitude of the torque transmitted to the indirectly driven shaft, in accordance with the invention forming the subject of my pending application Serial No. 365,682, filed May 24th, 1928. If desired, however, the pivotal movement of the radius arm may be controlled in any other suitable manner, for example by a spring link connected to the free end of the radius arm.

The invention is hereafter described with reference to the accompanying drawings, in which:

Figure 1 is a sectional elevation of a construction embodying the invention, the friction gearing being shown in the top gear or direct drive position.

Figure 2 is a corresponding end view, showing also the radius arm and driven member in dotted lines in the low gear or eccentric position.

Figures 3, 4 and 5 represent modified arrangements, Figures 3 and 5 being end views similar to Figure 2, and Figure 4 being a part section on the line 4—4 of Figure 3.

Figure 6:
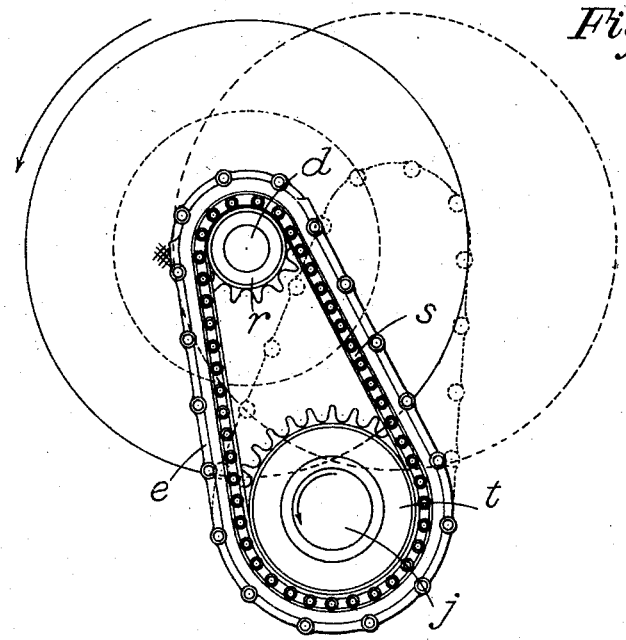

Figure 6 is an end view of a further modification in which a chain drive is employed.

Figure 7:
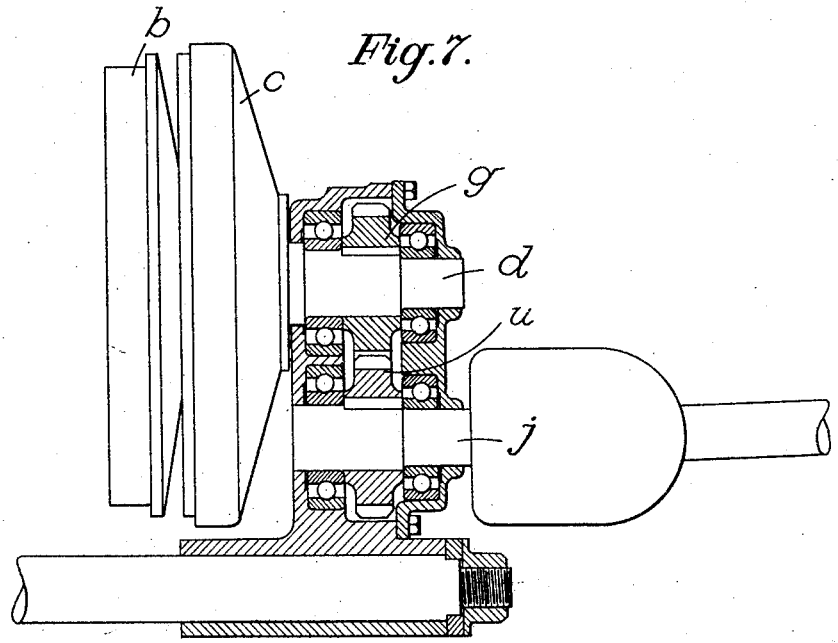

Figure 7 is a part sectional elevation of a further modification.

In Figure 1, $a$ represents the driving shaft, which is slidable axially under the control of a speed governor (not shown) or other suitable means, such as a hand lever for regulating the position independently of the governor. Upon this shaft $a$ there is secured a friction disc $b$ having a coned end face $b^1$ against which there is pressed a driven member in the form of a wheel $c$ having an annular friction face $c^1$ coned to the same angle as the face $b^1$ of the driving disc, and carried by a loose concentric member $c^2$ as described in my prior specification Serial No. 291,123, filed July 7th, 1928. The shaft $d$ of the driven member $c$ of the friction gearing is mounted in suitable bearings towards one end of a radius arm $e$, the other end of which is pivoted upon an articulation support $f$. The radius arm $e$ assumes the form of a hollow casing, and at the end where the shaft $d$ of the driven member passes through it, a spur pinion $g$ is keyed upon this shaft inside the casing. Meshing with this pinion $g$, there is also mounted inside the radius arm casing an idler pinion $h$ in turn meshing with a gear wheel $i$ of larger size, secured to a shaft $j$ journaled in a suitable bearing $j^1$ in the interior of the support $f$, the other end of this shaft projecting away from the disc $b$ and being connected by a telescopic, universal or other suitable joint to the propeller shaft of the vehicle or equivalent.

In order to maintain the frictional surfaces of the members $b$ $c$ in engagement, axial pressure is applied to the shaft $d$ of the driven member by any convenient means. In the construction illustrated, the axial pressure is transmitted to the shaft $d$ through the radius arm itself, the casing of the latter being made of ample strength and the support $f$ being designed to withstand the overhung end pressure on the casing due to the pressure between the disc $b$ and wheel $c$. In line with the support $f$ and driven shaft $j$ there is provided an adjustable thrust bearing $k$ mounted on the vehicle frame or upon the housing of the friction gearing, and arranged clear of the rim of the disc $b$, this bearing $k$ also providing means for taking up any wear upon the friction surfaces $b^1$ $c^1$.

As shown in Figure 2, suitable stops $l$ $l^1$ are provided at opposite ends of the swinging movement of the radius arm $e$, these stops being mounted upon the vehicle frame, so as to confine the movement between the top and bottom gear positions.

The pinion $g$ is shown fixed rigidly upon the shaft $d$, while the idler pinion $h$ is free to slide endwise upon its axle $h^1$, both pinions being of double helical type. The gear wheel $i$ may be secured upon the shaft $j$ and the latter allowed to slide through its bearing $j^1$, the longitudinal movement being taken up by the universal joint mentioned above or by other means.

Since the two pinions $g$ $h$ and the gear wheel $i$ form a train of gearing transmitting power from the shaft $d$ to the shaft $j$, with all the journal bearing loads taken up by the radius arm casing, the radius arm will be subject to a torque substantially equal to that in the driven shaft $j$; this torque reaction will tend to swing the radius arm around its articulation support $f$ so as to bring the driven wheel $c$ of the friction gearing to its eccentric position, as shown in dotted lines in Figure 2. The forward thrust of the coned driving disc $b$, on the other hand, tends to restore the driven wheel to its coaxial position, so that the actual position of the driven wheel and therefore the gear ratio provided by the friction gearing will depend upon the particular conditions of operation, as described in my prior patent specification Serial No. 291,122.

Figures 3 and 4 illustrate a modified construction in which the radius arm $e$ is provided with lateral extensions $m$ of which the forked extremities $m^1$ are fitted with rollers $n$ engaging with a curved guide rail $o$, so that the axial thrust upon the driven member is taken upon the guide rail at two points lying on opposite sides of the shaft $d$.

Alternatively, as illustrated in Figure 5, the axial thrust may be taken by a thrust rod $p$ connected to a lateral extension $m^2$ on the radius arm, the ends of the thrust rod being fitted with ball joints (not shown) in the well known way to allow for its deflection as the radius arm swings about its fulcrum in the operation of the variable gearing.

It will be understood that the invention is not limited to the particular arrangement of gearing described in combination with the radius arm. For example, the demultiplication may be provided in a single stage by means of a chain drive or gearing. Figure 6 represents a chain drive from the sprocket $r$ upon the shaft $d$, by way of a roller chain $s$ to a sprocket $t$ upon the shaft $j$, the chain drive being wholly enclosed in the casing of the radius arm $e$; in this figure the cover of the casing has been removed to show the chain.

Figure 7 shows the shaft $d$ of the driven member $c$ fitted with a pinion $g$ which engages directly with a gear wheel $u$ on the driven shaft $j$, without the use of an intermediate idler pinion. Again, the driven shaft instead of being disposed in line with the articulation support or pivot of the radius arm, as in Figures 1 to 6, may be arranged at a position between the axis of the driven member $c$ and the pivot of the radius arm, as illustrated in Figure 7; in either case, the lateral movement of the driven shaft will be less than the lateral displacement of the driven member of the friction gearing.

The invention is intended more particularly for the application of friction gearing of the type described to the driving of heavy vehicles, in which the necessary reduction of velocity ratio (with the friction gearing giving a direct drive on top gear) cannot conveniently be provided in the single gearing usually incorporated in the rear axle of the vehicle. The invention may, however, be applied to all classes of machinery for which variable friction gearing mechanism is suitable, such as the driving of locomotives upon railways.

What I claim is:—

1. A variable friction gearing, comprising a driving member, a driven member, a radius arm supporting said driven member a fulcrum axis for said radius arm, said fulcrum axis being parallel to and at a fixed distance from the axis of said driving member, movement of said radius arm in one direction causing said driven member to move from a position coaxial with said driving member to an eccentric position, a shaft mounted in alignment with the fixed fulcrum axis of said radius arm, and gears carried by said radius arm, said gears transmitting power from said driven member to said shaft and the reaction of said gears upon said radius arm tending to swing said radius arm upon its fulcrum to bring said driven member eccentric to said driving member.

2. A variable friction gearing, comprising a driving member, a driven member, a radus arm supporting said driven member, said radius arm allowing said driven member to move from a position coaxial with said driving member to an eccentric position, a gear mounted at the free end of said radius arm in alignment with and connected to said driven member, a second gear mounted on said radius arm and meshing with said first mentioned gear, and a shaft in driving connection with said second gear, said shaft having a bearing upon said radius arm adjacent to the fulcrum axis thereof, and the reaction upon said radius arm controlling the position of said driven member relative to said driving member.

3. A variable friction gearing, comprising a driving member, a driven member, a radius arm supporting said driven member, a fixed fulcrum for said radius arm, said driven member being displaceable laterally from a position coaxial with said driving member to an eccentric position by movement of said radius arm in one direction about said fulcrum, a shaft mounted substantially parallel to the axis of said driving member, said shaft being subject to a smaller lateral displacement than said driven member, and positive gearing transmitting power from said driven member to said shaft, and the reaction upon said radius arm controlling the position of said driven member relative to said driving member.

4. A variable friction gearing, comprising a driving member, a driven member, a radius arm supporting said driven member, a fixed fulcrum axis for said radius arm, movement of said radius arm in one direction about said fixed fulcrum axis causing said driven member to move from a position coaxial with said driving member to an eccentric position, a shaft mounted in alignment with the fulcrum axis of said radius arm, a gear mounted upon said shaft, a second gear mounted on said radius arm and meshing with said first mentioned gear, and a gear mounted at the free end of said radius arm in alignment with and connected to said driven member, said last mentioned gear meshing with said second gear and thereby transmitting the power from said driven member to said shaft, and the reaction of said gears upon said radius arm tending to swing said radius arm upon its fulcrum to bring said driven member eccentric to said driving member.

5. In combination with a variable friction gearing comprising co-operating driving and driven members of the kind described, a radius arm supporting the driven member of said friction gearing, a fixed fulcrum axis for said radius arm, a gear wheel rotatably mounted upon said radius arm in driving connection with said driven member, an idler gear wheel rotatably mounted upon said radius arm and meshing with said first mentioned gear wheel, a driven shaft having a bearing in said radius arm adjacent to the fulcrum axis thereof, and a gear wheel secured upon the said driven shaft and meshing with said idler gear wheel, and the reaction of said gears upon said radius arm tending to swing said radius arm upon its fulcrum to bring said driven member eccentric to said driving member.

6. In combination with a variable friction gearing comprising co-operating driving and driven members of the kind described, a casing, a fixed fulcrum about which said casing can rock, said casing forming a radius arm supporting the driven member of said friction gearing, a shaft rotatably mounted in said casing in alignment with said fulcrum, a toothed wheel secured upon said shaft within said casing, a second toothed wheel rotatably mounted within said casing at the end remote from said fulcrum, said second wheel being aligned with and having driving connection with said driven member, and positive means for transmitting the rotation of said second wheel to the wheel upon said shaft, and the reaction of said gears upon said radius arm tending to swing said radius arm upon its fulcrum to bring said driven member eccentric to said driving member.

7. In combination with a variable friction gearing comprising co-operating driving and driven members of the kind described, a casing, a fixed fulcrum support for said casing, said casing forming a radius arm supporting the driven member of said friction gearing, a thrust bearing for said casing arranged in alignment with the axis of said fulcrum support, a driven shaft having a bearing in said fulcrum support adjacent to said casing, and positive gears enclosed within said casing, said positive gears transmitting the rotation of said driven members to said driven shaft, and the reaction of said gears upon said radius arm tending to swing said radius arm upon its fulcrum to bring said driven member eccentric to said driving member.

8. In combination with a variable friction gearing comprising co-operating driving and driven members of the kind described, a casing, a fixed fulcrum support for said casing, a driven shaft rotatably mounted in said fulcrum support, a gear wheel secured upon said driven shaft within said casing, a shaft secured to the driven member of said friction gearing, bearings for said last mentioned shaft in opposite walls of said casing at its end remote from said fulcrum support, a gear wheel secured upon said last mentioned shaft within said casing, an idler wheel meshing with said gear wheels inside said casing, and an axle secured between opposite walls of said casing, said idler wheel mounted rotatably upon said axle, said casing tending to swing said casing about its fulcrum to bring said driven member eccentric to said driving member.

9. In combination with a variable friction gearing comprising co-operating driving and driven members of the kind described, a casing, a fulcrum support for said casing, a driven shaft rotatably mounted in said fulcrum support, a double helical gear wheel secured upon said driven shaft within said casing, a shaft secured to the driven member of said friction gearing, bearings for said last mentioned shaft in opposite walls of said casing at its end remote from said fulcrum support, a double helical gear wheel secured upon said last mentioned shaft within said casing, an idler wheel of double helical type meshing with said gear wheels inside said casing, and an axle secured between opposite walls of said casing, said idler wheel mounted rotatably upon said axle and slidable thereon to equalize the loading on the teeth of said gear wheels, said casing tending to swing said casing about its fulcrum to bring said driven member eccentric to said driving member.

10. A variable friction gearing, comprising a driving member, a driven member, a casing, a fixed fulcrum for said casing, a driven shaft mounted in alignment with said fixed fulcrum, a gear wheel secured upon said driven shaft inside said casing, a shaft journaled in said casing at an end remote from said fulcrum, said driven member being secured upon said last mentioned shaft outside said casing, a gear wheel secured upon said last mentioned shaft inside said casing, positive driving means connecting said gear wheels inside said casing, said casing forming a radius arm movable about said fulcrum and by its movement in one direction causing said driven member to swing from a position coaxial with said driving member to a position eccentric thereto, and means supporting said casing to resist the end thrust of said driven member, said casing being controlled automatically by the reaction of said gear wheels to vary the relative eccentricity of said driving and driven members.

11. A variable friction gearing comprising a conical driving member, a driven member, a radius arm supporting said driven member, stops limiting the movement of said radius arm between a position with said members coaxial and a position of relative eccentricity, said driving member being slidable axially to engage with said driven member and the engagement of said members tending to bring them to the coaxial position, a driven shaft, and positive power-transmitting means connecting said driven member to said driven shaft, said power-transmitting means being carried by said radius arm, and the reaction of said power-transmitting means upon said radius arm tending to bring said members to the eccentric position.

12. A variable friction gearing comprising a conical driving member, a driven member, a driven shaft, a radius arm supporting said driven member and said driven shaft, a fixed fulcrum axis for said radius arm, movement of said radius arm in one direction about said fulcrum axis causing said driven member to move from a position coaxial with said driving member to an eccentric position, and positive gearing carried by said raidus arm and connecting said driven member to said driven shaft, said driving member being slidable axially to engage with said driven member, the engagement of said members tending to bring them to the coaxial position, and the reaction of said positive gearing upon said radius arm tending to bring said members to the eccentric position.

In testimony whereof I have affixed my signature.

JOHN HOGG ROBERTSON.